Patented Mar. 2, 1954

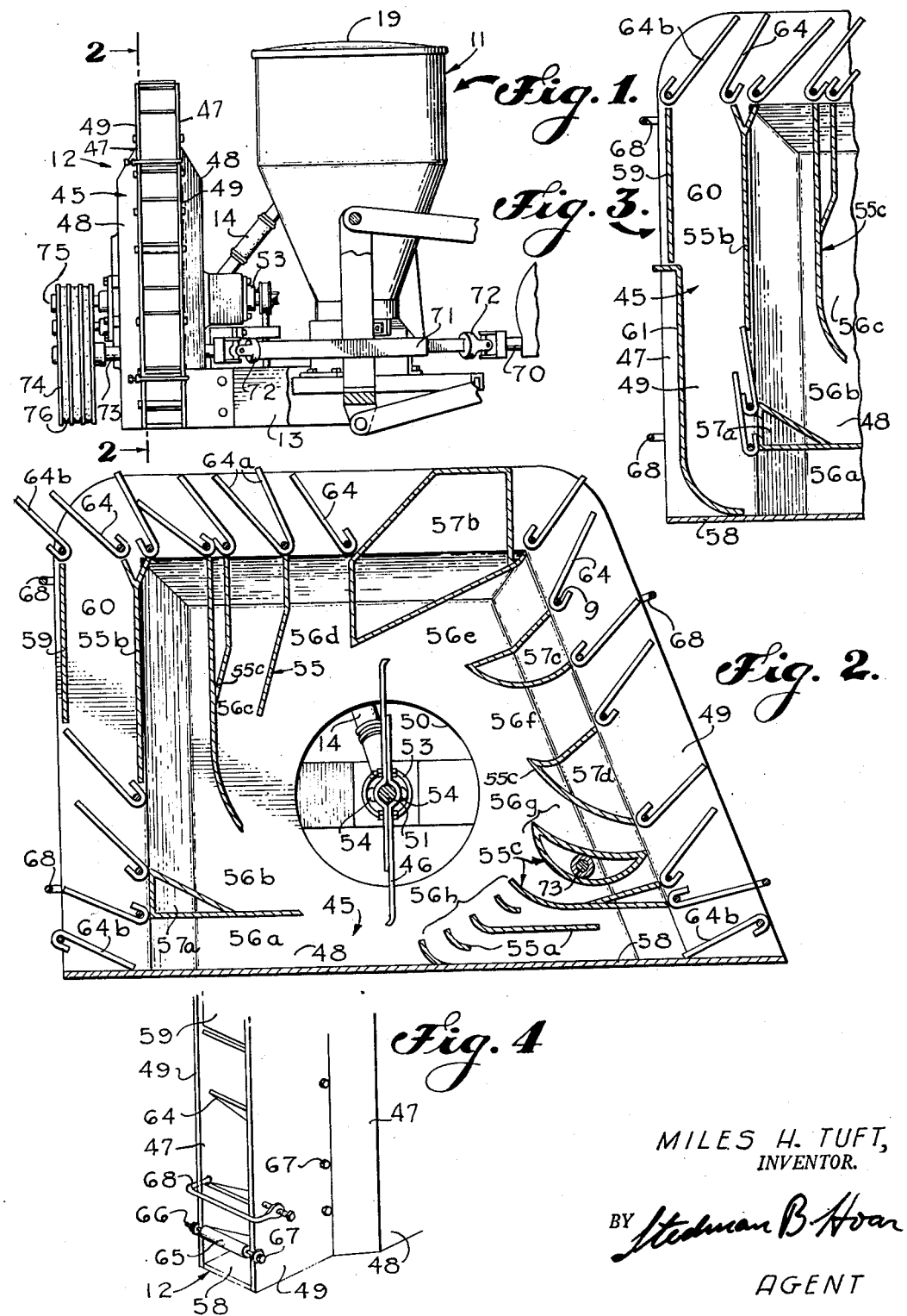

2,670,566

UNITED STATES PATENT OFFICE 2,670,566

DUSTING MACHINE

Miles H. Tuft, Huntington Park, Calif., assignor to Hardie Manufacturing Company, Hudson, Mich., a corporation of Michigan Original application December 16, 1949, Serial No. 133,331. Divided and this application August 18, 1951, Serial No. 242,510

7 Claims. (Cl. 43—148)

This invention relates to agricultural machinery and more particularly relates to machinery for spreading dusts or powders, such as insecticides, upon crops or orchards, and is a divisional application of my copending application Serial No. 133,331, filed December 16, 1949.

It is an object of this invention to provide a dusting machine capable of spreading cropdusting powders laterally and vertically so as to cover a wide area and a considerable height.

A further object of the invention is to provide a dusting machine having simple and easily adjusted means for controlling and directing the spread of dusting powders in desired areas and directions.

Another object of the invention is to provide a dusting machine which is relatively free from clogging or packing and which is efficient in maintaining the dust in a fluid condition and in discharging the dust in a finely comminuted cloud of even distribution and density.

Still another object of the invention is to provide a dusting machine in which control of the volume of dust distributed in a given unit of time or of area is easily effected, with resultant control of the density of the dust cloud.

Other objects and advantages of the invention will be pointed out as the following description of a preferred embodiment of the invention proceeds, or will be apparent from that description and from consideration of the accompanying drawings illustrative of that embodiment, in which:

Figure 1 is a side elevational view of my improved dusting machine;

Figure 2 is a transverse vertical sectional view of the blower, or dust distributor, taken on the plane of section 2—2 of Fig. 1, and illustrating the system of distributing valves;

Fig. 3 is a fragmentary sectional view of a portion of the distributing valve system shown in Fig. 2, and illustrating changes in the valve settings and housing which may be effected to control the direction of the dust cloud; and Fig. 4 is a fragmentary perspective view illustrating means for locking the distributing valve system in desired positions.

It is to be understood that my dusting machine will ordinarily be supported on a tractor or trailer and will derive power from the automotive source. For clarity of illustration, the dusting machine only has been shown in the drawings, with as much of the securing framework and power transmission mechanism as will illustrate the method of operation.

Having reference now to the details of the drawings, my improved dusting machine comprises a hopper 11 and a blower 12 supported on a suitable framework 13, and connected by a conduit 14, through which dust stored in the hopper may be delivered to the blower for distribution.

The blower 12 comprises a casing 45 in which is mounted a centrifugal impeller or fan 46. The side walls 47 of the casing 45, both of which are preferably disk-shaped, have central portions 48 spaced apart to accommodate the impeller and the hereinafter described air-passages, and marginal portions 49 more narrowly spaced to provide high-velocity outlets from the air-passages. Suitable openings 50 in the central wall portions 48 permit the shaft 51 of the impeller 46 to extend therethrough and provide for the intake of air. The shaft 51 extends through the openings 50 and through a shaft housing 53 adjacent to the hopper 11 into which the lower end of the conduit 14 discharges. A small auxiliary fan 54 is mounted on the shaft 51 substantially at the lower end of the conduit 14. Dust from the conduit thus enters the shaft housing 53, as shown in Figure 2, to be drawn along the shaft 51 to the center of the impeller 46, there to be mixed with air and impelled centrifugally.

Beginning at the periphery of the zone of movement of the impeller 46, a plurality of baffles 55 extend outwardly between the wall portions 48 to define outwardly and upwardly extending air passages 56a, 56b, 56c, 56d, 56e, 56f, 56g and 56h which may be interspersed with dead air spaces as shown at 57a, 57b, 57c, and 57d, in Figure 2. The baffles 55 are preferably welded to the wall portions 48 and except where they enclose a space not intended for the passage of air, they preferably terminate outwardly at the periphery of the more widely spaced wall portions 48. As herein illustrated, the number of air passages is eight, but more or less may be provided, and it will be observed that the inner ends of the baffles are so spaced as to divide the periphery of the impeller into eight substantially equal zones, each zone admitting to an air-passage, and the sum of the cross-sectional areas at the inner ends of the air passages being substantially equal to the area of the path defined by the outer ends of the impeller when in motion. Thus all of the air passages may receive substantially equal amounts of dust and air, and there is virtually no waste space to cause turbulence and air-pressure variations that might affect the distribution of dust. However, as the air passages lead outwardly they become narrower, in order to increase or at least maintain the velocity of the air. This necessitates the formation of the dead spaces 57 between the air passages, which may be provided by joining two baffles 55 at their inner ends and permitting them to diverge outwardly as shown at 55c in Figs. 2 and 3.

As the embodiment of the invention herein illustrated is intended for dusting trees and high crops and not for dusting the ground over which it is transported, no provision is made for downwardly directed air-passages, and the bottom of the casing 45 is closed by a wall 58. Consequently, it becomes desirable to provide means for preventing accumulation and caking of dust in the lower quarter-periphery of the blower, particularly in that zone in which the fan is driving the dust downwardly against the imperforate wall 58. The entrance area of air-passages in this zone, specifically passages 56g and 56h, may therefore be subdivided by short baffles 55a to provide a plurality of narrow passages in which the air velocity is high and which assist each other by aspiration or induced draft to clear dust that may begin to accumulate in any one of them.

When the dusting machine is used to dust the outer side of the outer row of an orchard, there is no need for bilateral distribution of dust. A permanent exterior end wall 59 may be disposed between the outer casing walls 49 at one side of the casing, cutting off the lateral flow of air. The space 60 bounded outwardly by the wall 59 and by a baffle 55b dividing it from air passage 56b, may be a temporary dead air space, as shown in Figure 2, or may be converted into an upwardly directed air-passage as shown in Figure 3. When the space 60 is to be used as an air passage, a temporary exterior wall 61 may be placed between the margins of the wall portions 49 in extension of the permanent wall 59 to the bottom wall 58.

Air valve plates 64 are swingably mounted on pivot means 9 between the outer side walls 49 at the outer ends of the passages 56 and form extension outlets for the passages 56. By varying the positions of the plates 64, the extension outlets may be varied as to both direction and cross-sectional area, or may be closed. As the majority of the passages 56 have dead air spaces 57 interspersed between them, the plates 64 will ordinarily be arranged in pairs of individual plates respective to each air passage. Where, however, two passages adjoin without an intervening dead space, the plates forming the dividing extension outlet wall may be joined, as at 64a. Where the air passage wall extends to the periphery of the casing 45, as do the bottom wall 58 and the permanent end wall 59, the valve plates may be mounted adjacent the outer margins of the wall portions 49, as shown at 64b, and may swing inwardly.

To permit the air valve plates 64 to swing and to be easily removed, interchanged, and exchanged, the plates are constructed with open hinge-bends 65 and are mounted on ordinary bolts 66 which extend through the wall portions 49. The wall portions 49 are not entirely rigid, but are made of material such as sheet iron, capable of yielding resiliently to pressure. The central portions 48 are, of course, held spaced by the baffles 56, welded thereto, so as not to collapse upon and interfere with the impeller 46, but the outer portions 49 are for the most part unsupported laterally and may be pressed toward one another by tightening nuts 67 on the bolts 66. Thus the valve plates 64 may be clamped in any desired position by simply tightening the nuts 67. As added means for clamping the valve plates 64, clamps 68 are provided, which will be found particularly effective when used on the margins of the outer wall portions 49 in proximity to permanent spacing elements such as the bottom wall 58 or end wall 59.

To drive the dusting machine, power may be taken from power transmitting mechanism 70 of the tractor or other prime mover, and transmitted through a shaft 71 provided with end universal joints 72 to a pulley shaft 73 which may extend rearwardly through the blower through one of the dead air spaces 57. A pulley 74, preferably of V-type, on the shaft 73, drives a pulley 75 on the impeller shaft 51 by belts 76.

In operation of my improved dusting machine the operator determines from the nature of the work to be performed the desired directional setting of the dust jets which will emanate from the blower, the desired velocity of the jets in order to reach distant points such as tree tops, and the desired dust-concentration in the jets. If, for example, the operator desires to proceed between two rows of trees, dusting both rows simultaneously, he may set the valve plates as shown in Figure 2 and clamp them in that position by tightening nuts 67 and clamps 68. It will be seen from Figure 2 that air passages 56a and 56b are open to dust lower foilage to the left of the blower, the upward extension of 56b and the optional space 60 being closed; air passages 56c and 56d will throw dust toward the upper left; air passages 56e and 56f will throw dust to the upper right; and lower foilage to the right will be dusted from air passages 56g and 56h. If only trees to right of the blower were to be dusted, the operator might leave the air valve plates of passages 56e, 56f, 56g and 56h in the aforesaid positions and turn the valve plates controlling the outlets of passages 56d, 56c, the upward branch of 56b and the space 60 also to the right. The valve plate controlling the lower entrance to the space 60 may be removed, and the immediately lower valve plates be raised to close the lower branch of passage 56b and to fully open passage 56a. By temporary insertion of the temporary end wall 61 the passage 56a is made continuous with the space 60, to discharge upwardly and to the right.

When the various valve plates are being set for direction, they are also set to provide more or less throttle to the outlets which they control. If all the outlets are throttled to substantially like degree, the jets emanating therefrom will be substantially alike in velocity and volume and in dust-concentration—that is, the ratio of dust to air in each jet—because the inlet areas of the air passages, the air-dust mixture at the inlet, and the pressure at the inlets is substantially alike. But an increase of throttle applied to one outlet with respect to others will cause a back pressure in that outlet which will decrease the volume of air-dust mixture through the particular air-passage and consequently reduce the quantity of dust discharged by that outlet.

It is not necessary to vary the speed of operation in order to vary the total amount of dust distributed or to maintain a constant speed of operation in order to maintain a constant volume of dust, as the volume may be controlled at the hopper 11 by various mechanisms, for example the mechanism described in my co-pending application Serial No. 133,331, in accordance with momentary requirements. When some of the outlets from the blower are inactivated by closure, the volume of air emanating individually from the remaining outlets will be increased, but the volume of dust emanating individually from these remaining outlets may be maintained constant by throttling at the hopper. This step reduces the concentration of the air-dust mixture, but if, for example, the outlets remaining open are all directed to one side of the machine, it allows the total amount of dust thrown in that direction to remain constant.

During all of the above-described conditions of operation, the small auxiliary fan 54 will operate to create a partial vacuum in the conduit 14 and to draw whatever dust may enter the conduit 14 to the blower. The valve plates 64 may be so throttled as to prevent any discharge of dust, yet the fan 54 will prevent clogging in the conduit 14, drawing air therethrough and discharging through the opposite air-intake opening 50 if no other outlet is available. When any of the valve plates 64 are open, the conflict between air drawn through the opening 50 by the fan 46 and air drawn through the conduit 14 by the fan 54 creates a great turbulence and thoroughly mixes the dust with the air.

Obviously many changes and modifications in the arrangement and construction of my improved dusting machine are possible within the scope and spirit of the invention; therefore, I do not wish to be limited to the precise embodiment herein described and illustrated, but only to the scope of the appended claims.

I claim:

1. In a dusting machine: a blower having a casing and central inlets for air and for dust and an impeller for blowing said air and dust centrifugally; baffles in said casing extending outwardly from the zone of movement of said impeller and defining a plurality of laterally and upwardly extending air passages, said baffles being so arranged that the sum of the cross-sectional areas of the inner ends of said passages is substantially equal to the area of the path defined by the outer ends of said impeller when in motion, and the individual cross-sectional areas of said inner ends are at least equal to the cross-sectional areas of the outer ends of the perspective passages, whereby the air velocity within said passages is maintained during outward travel; and valve plates respective to each of said passages swingably mounted in extension of the baffles respective to said passages so as to be movable to positions in which they form outward extensions of said passages and may diminish the cross-sectional areas of said extended passages and may control the directions in which said extended passages discharge.

2. In a dusting machine: a blower having a casing and central inlets for air and for dust and an impeller for blowing said air and dust centrifugally; baffles in said casing extending outwardly from the zone of movement of said impeller and defining a plurality of laterally and upwardly extending air passages, said baffles being so arranged that the sum of the cross-sectional areas of the inner ends of said passages is substantially equal to the area of the path defined by the outer ends of said impeller when in motion, and the individual cross-sectional areas of said inner ends are at least equal to the cross-sectional areas of the outer ends of the perspective passages, whereby the air velocity within said passages is maintained during outward travel; and a pair of valve plates respective to each of said passages mounted swingably at the outer end of each of said respective passages in extension of the baffles forming said respective passages, the plates of each of said pairs being swingable with respect to each other to control the directions in which the passage respective thereto discharges and being capable of closing said passage.

3. In a dusting machine: a blower casing including substantially parallel side walls; an impeller mounted for rotation between said side walls and arranged to blow air centrifugally between said side walls; a plurality of baffles joining said side walls and extending outwardly from positions adjacent the periphery of said impeller to positions inward from the periphery of said side walls; some of said baffles defining passages for conducting air blasts from said impeller and others of said baffles being joined at their inner end to define zones from which said air blasts are excluded; a plurality of valve plates hingedly mounted between said side walls outwardly from said baffles and forming extension walls for said air passages and adapted to be moved to positions in which they control the direction and degrees of opening of said extended air passages; said side walls having limited flexibility outwardly from said baffles; and means for clamping said side walls against said valve plates to hold said valve plates in selected positions.

4. In a dusting machine: a centrifugal blower having side walls of limited flexibility; baffles spacing said side walls and defining air passages; valve plates pivotally mounted on said blower between said side walls at the outer ends of said passages for controlling the outlets of said air passages; and means for compressing said side walls against said valve plates to hold said valve plates in selected positions.

5. In a dusting machine: a centrifugal blower having side walls of limited flexibility; baffles holding portions of said side walls in spaced relationship and defining air passages; hinge means mounted between said side walls outwardly from said spaced wall portions; valve plates carried by said hinge means and movable to control the outlets of said air passages; and means acting on said hinge means of said valve plates for pressing the outer portions of said side walls convergently to inhibit movement of said valve plates.

6. In a dusting machine: a centrifugal blower having baffles defining outwardly extending air passages, and side walls held spaced by said baffles and extending therebeyond, the outwardly extending portions of said side walls having limited flexibility; valve plates mounted between said outwardly extending wall portions and movable to control the outlets of said air passages; and clamping means for flexing said outwardly extending wall portions into contact with said valve plates to inhibit movement of said valve plates.

7. In a dusting machine: a centrifugal blower; a casing for said blower including side walls having flexible marginal portions; plates mounted swingably between said marginal portions for directing the blast of said blower; means holding the central portions of said side walls in spaced relation; and means for pressing said flexible marginal portions upon said plates to hold said plates in selected positions.

MILES H. TUFT.

References Cited in the file of this patent

UNITED STATES PATENTS

| Number | Name | Date |
|---|---|---|
| 1,987,565 | Althouse et al. | Jan. 15, 1935 |
| 2,224,312 | O'Day | Dec. 10, 1940 |
| 2,333,818 | Raney | Nov. 9, 1943 |